(No Model.)

G. W. HETH.
PNEUMATIC VEHICLE TIRE.

No. 597,146. Patented Jan. 11, 1898.

Witnesses
A. E. Tanberg
Cornelia Reddy

Inventor
George W. Heth
By his Attorney
E. Ray Ammann

THE NORRIS PETERS CO., PHOTO-LITHO., WASHINGTON, D. C.

UNITED STATES PATENT OFFICE.

GEORGE W. HETH, OF CHICAGO, ILLINOIS.

PNEUMATIC VEHICLE-TIRE.

SPECIFICATION forming part of Letters Patent No. 597,146, dated January 11, 1898.

Application filed July 9, 1897. Serial No. 643,967. (No model.)

*To all whom it may concern:*

Be it known that I, GEORGE W. HETH, of Chicago, in the county of Cook and State of Illinois, have invented new and useful Improvements in Pneumatic Vehicle-Tires; and I do hereby declare the following to be a full, clear, and exact description of said invention, reference being had to the accompanying drawings, and to the figures of reference marked thereon, which form a part of this specification.

My invention relates to improvements in pneumatic tires for vehicles, and will be understood by a reference to the accompanying drawings, in which—

Figure 1:
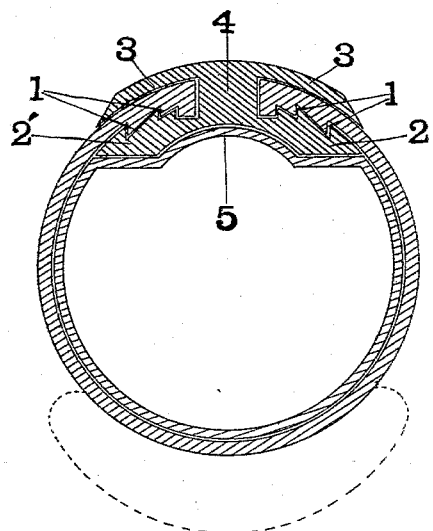
Figure 2:
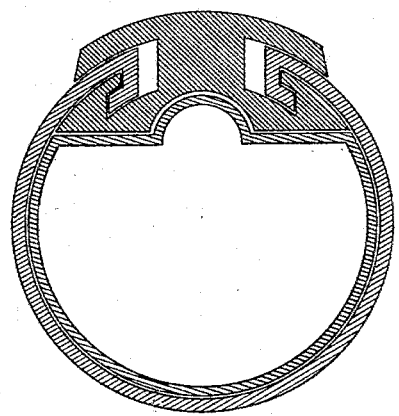

Figure 1 is a cross-section (transverse) of my tire. Fig. 2 is a modified form of same.

The particular features of my invention are the location and construction of the opening in the outer tube or tire proper and the manner and means of closing said opening.

As is well known, forms of pneumatic tire are in common use with an opening on the inside or where the tire comes in contact with the rim of the wheel, which in cases of removal for the purposes of making repairs to the inner tube necessitate either the tearing loose of the tire from the cement by which it is attached to the rim of the wheel, or, where the tire is of the detachable type and held in the rim by corrugations, the rim must necessarily be made larger to provide the proper amount of material in the same—that is, to compensate for the material removed for the reception of the locking-corrugations in the tire. I seek to obviate both of these objections by locating the opening of the tire along and throughout the outer longitudinal circumference of the tire or outer tube thereof where the same comes in contact with the ground or at the tread. As a means of closing and locking said opening I form upon the inner surface of said outer tube, near the opening, a number of serrations 1, extending throughout the circumference of the tire parallel with the opening, the inclination of which serrations is away from said opening. For the purpose of engaging said serrations a lock is provided, which lock consists of a base 2, head 3, and body 4. The base of said lock has upon its upper face, at each side of the body 4, corrugations 2' to receive the serrations 1 of the tire, and when the serrations 1 are engaged in the corrugations 2' and the inner tube 5, which is of the common construction, is inflated the pressure of said inner tube against the base of the lock causes said base to press tightly against the tire, by which means said tire is tightly clamped between the opposing surfaces of the base and head of said lock. The base and head of said lock are vulcanized to a considerable degree, but the body 4 is preferably quite elastic.

The dotted lines in Fig. 1 represent the position occupied by the wheel-rim.

For the purpose of insuring a close and perfect conformity of the lock to the tire the circumference of said lock is made somewhat less than that of the tire, which insures a close conformity of the head 3 of the lock to the periphery of the tire.

It will be readily understood from the drawings and the foregoing description that when the air-tube is deflated the base 2 may be depressed and the serrations of the tire disengaged from the corrugations 2' of the base, when the tire may be readily removed from the lock for the purpose of access to the inner air-tube for the purpose of repairing same.

In the modified form shown in Fig. 2 the tire at the opening is folded back upon itself and a tongue is formed upon the base of the lock, which engages beneath the lap of the fold.

Having thus described my device, what I claim as new, and desire to secure by Letters Patent, is—

In a pneumatic tire of the form specified, an outer tube having an opening extending throughout its longitudinal circumference, the inner margin of said opening being supplied at each side with corrugations, in combination with a closing and locking device consisting of a base, body and head, said base being provided upon each side, juxtaposed to said tube, with serrations to receive the corrugations aforesaid, said head being adapted to bear upon the periphery of said tube and hold said serrations and corrugations in interlocked engagement with each other, all substantially as shown and described.

In testimony whereof I affix my signature in presence of two witnesses.

GEORGE W. HETH.

Witnesses:
A. E. TANBERG,
E. RAY INMAN.